United States Patent [19]

Caproon et al.

[11] Patent Number: 4,474,171

[45] Date of Patent: Oct. 2, 1984

[54] SOLAR ENERGY SYSTEM WITH STATIC HEAT-STORAGE DEVICE

[76] Inventors: Douglas M. Caproon, 5209 SW. 71st Pl., Miami, Fla. 33155; Gilbert F. Kato, 5090 Wick Dr., Oak Lawn, Ill. 60453; Francis B. Cianci, 265 Batavia La., Hoffman Estates, Ill. 60194

[21] Appl. No.: 361,965

[22] Filed: Mar. 25, 1982

[51] Int. Cl.³ .............................................. F24J 3/02
[52] U.S. Cl. ................................... 126/436; 126/437; 126/419; 126/400
[58] Field of Search ............... 126/400, 417, 430, 435, 126/432, 419, 424, 436, 437; 165/104.14

[56] References Cited

U.S. PATENT DOCUMENTS

| | | | |
|---|---|---|---|
| 2,595,905 | 5/1952 | Telkes | 126/419 |
| 2,677,367 | 5/1954 | Telkes | 126/436 |
| 3,773,031 | 10/1973 | Laing et al. | 126/400 |
| 4,066,062 | 1/1978 | Houston | 126/419 |
| 4,073,284 | 2/1978 | Laing | 126/271 |
| 4,082,143 | 4/1978 | Thomason | 165/104 |
| 4,114,600 | 9/1978 | Newton | 126/271 |
| 4,147,157 | 4/1979 | Zakhariya | 126/419 |
| 4,154,292 | 5/1979 | Herrick | 165/1 |
| 4,169,554 | 5/1979 | Camp | 126/427 |
| 4,180,124 | 5/1979 | Shurcliff | 165/1 |
| 4,187,904 | 2/1980 | Kuhnlein | 165/104 |
| 4,213,448 | 7/1980 | Hebert | 126/434 |
| 4,223,663 | 9/1980 | Carmichael et al. | 126/426 |
| 4,223,721 | 9/1980 | Schoenfelder | 165/104 |
| 4,233,960 | 11/1980 | Johnson | 126/430 |
| 4,246,466 | 1/1981 | Rice et al. | 219/325 |
| 4,250,871 | 2/1981 | Milburn, Jr. | 126/436 |
| 4,250,885 | 2/1981 | van Heel | 126/430 |
| 4,250,958 | 2/1981 | Wasserman | 165/46 |
| 4,258,696 | 3/1981 | Gopal | 126/400 |
| 4,272,492 | 6/1981 | Lane et al. | 126/400 |
| 4,287,942 | 9/1981 | Whitman | 165/104.14 |
| 4,290,416 | 9/1981 | Maloney | 126/430 |
| 4,291,756 | 9/1981 | Bracht | 165/104.17 |
| 4,338,917 | 7/1982 | Keller | 126/436 |

FOREIGN PATENT DOCUMENTS 134834  10/1979  Japan .................................. 126/419

Primary Examiner—James C. Yeung
Attorney, Agent, or Firm—John S. Fosse

[57] ABSTRACT

A thermal energy storage and transfer system comprises a water-filled network that includes an interconnected storage vessel, heat absorber and radiator means. In accordance with the invention, a hermetically sealed container that has been charged with a thermal energy storage salt is stationarily submerged in the water storage vessel. An adjustable louver device is disposed between the heat absorber and incident solar radiations, and the louvers or vanes are selectively and automatically opened and closed in response to the thermal levels in the water storage tank and in response to the presence or absence of sunlight.

7 Claims, 4 Drawing Figures

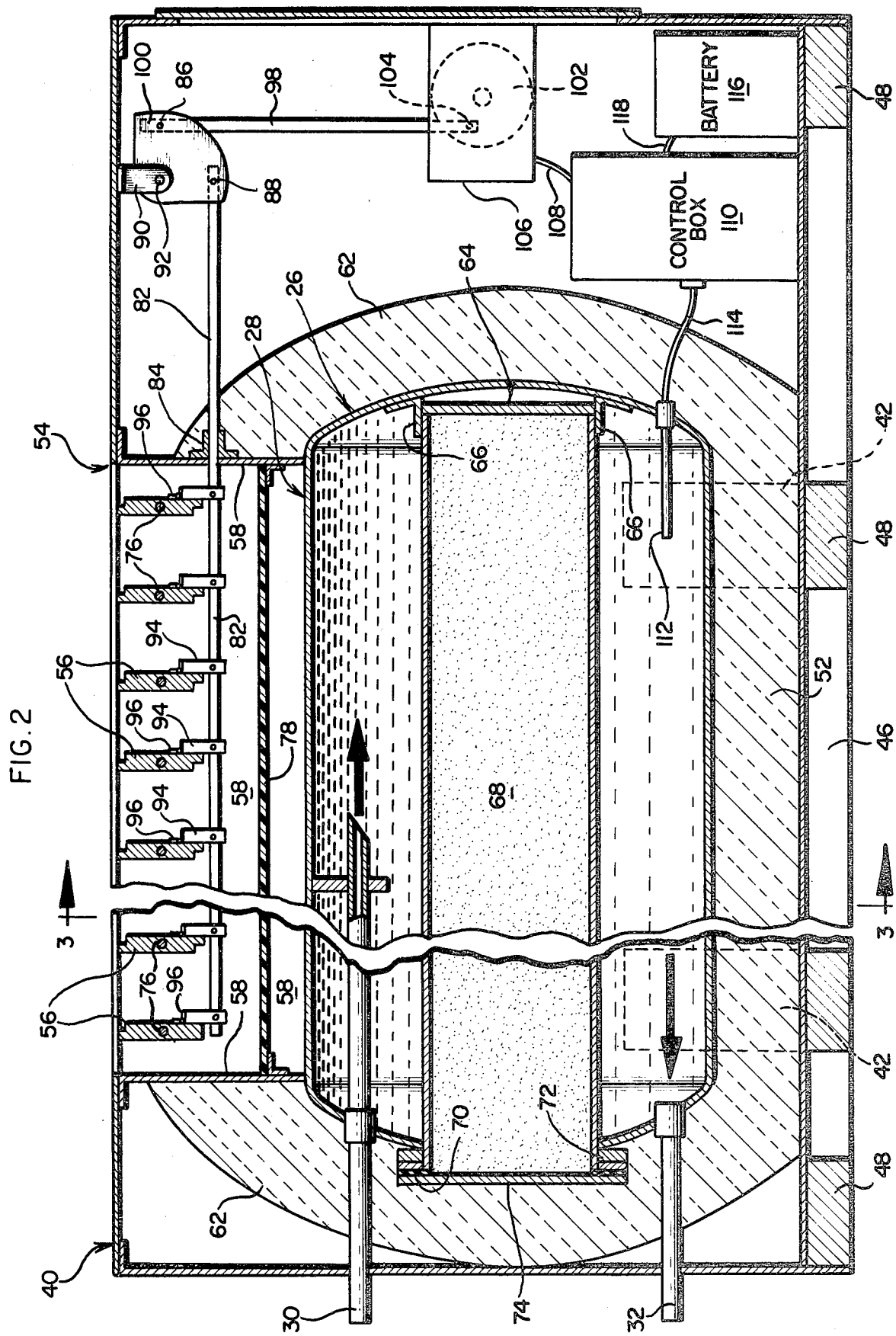

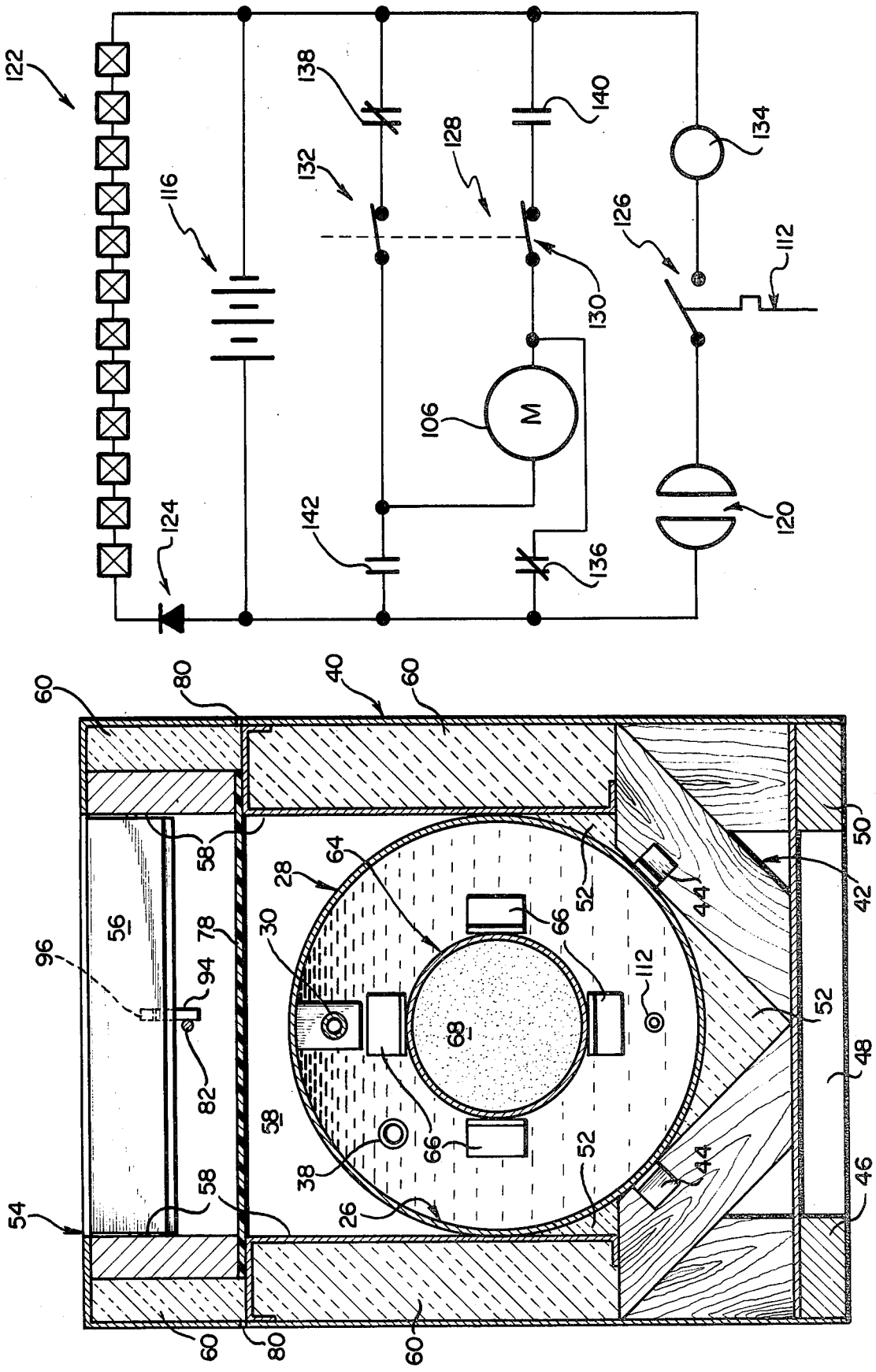

SOLAR ENERGY SYSTEM WITH STATIC HEAT-STORAGE DEVICE

FIELD OF THE INVENTION

This invention relates generally to systems for the collection, storage and transfer of solar heat energy and more specifically to compact solar heating systems for residential application.

BACKGROUND OF THE INVENTION

Ordinary water has many advantages for use as a heat-transfer medium in home heating systems, especially those relying at least in part on solar heat energy input. Nevertheless, water is not space-efficient as a thermal energy storage medium; and as a consequence, efforts have been made in the past to provide a compact thermal "battery" or "flywheel" for use in solar hot water heating systems by incorporating therein a vessel filled with an inorganic, liquid-solid phase-change material such as Glauber's salt ($Na_2SO_4 \cdot 10H_2O$) for purposes of storing and selectively releasing heat energy. However, a serious problem exists with these prior art arrangements in that the selected phase-change salt tends to stratify as separate layers of hydrated crystals and anhydrous salt during operation of the system unless mechanical agitation is somehow applied to the salt or to its container. The auxiliary equipment needed for this agitation defeats the objective of space-efficiency and requires a supplemental energy input, usually high-cost electricity.

As an alternative to mechanical agitation, liquid-solid phase-change materials have been proposed which incorporate means for nucleating the thermal energy storage salt. The potentially most useful of these latter systems have proved to be sensitive to the damaging effects of moisture invasion, thus ruling out their utilization heretofore in conventional hot-water heating systems.

SUMMARY OF THE INVENTION

The present invention overcomes the limitations of the prior art by providing a hot-water heating system with a thermal energy accumulator which comprises a charge of hydrated magnesium salts, hermetically sealed in a specially lined cylinder or tube. This device is stationarily positioned in the water storage tank in order to minimize its size for a given heat capacity.

Accordingly, a general object of the present invention is to provide a new and improved thermal energy storage and transfer system.

Another broad object of the invention is to provide a space-efficient solar heating system.

Still another object of the invention is to provide a solar heating system having means for automatically regulating the solar energy input in response to the temperature levels manifested in the system.

Yet another object of the invention is to provide a thermal energy storage and transfer system that is characterized by its useful longevity.

These and other objects and features of the invention will become apparent from a consideration of the following descriptions.

BRIEF DESCRIPTION OF THE DRAWINGS

In order that the principles of the invention may be readily understood, a single embodiment thereof, but to which the application is not to be restricted, is shown on the accompanying drawings wherein:

FIG. 2 is an enlarged, central, longitudinal, cross-sectional view of the fluid storage and solar heat absorber unit used in the system of FIG. 1;

FIG. 3 is a transverse cross-sectional view of the unit shown in FIG. 2, taken substantially along the line 3—3 thereof; and FIG. 4 is a schematic circuit diagram of the electrical controls used in the system of FIG. 1.

DETAILED DESCRIPTION OF THE INVENTION

Figure 1:
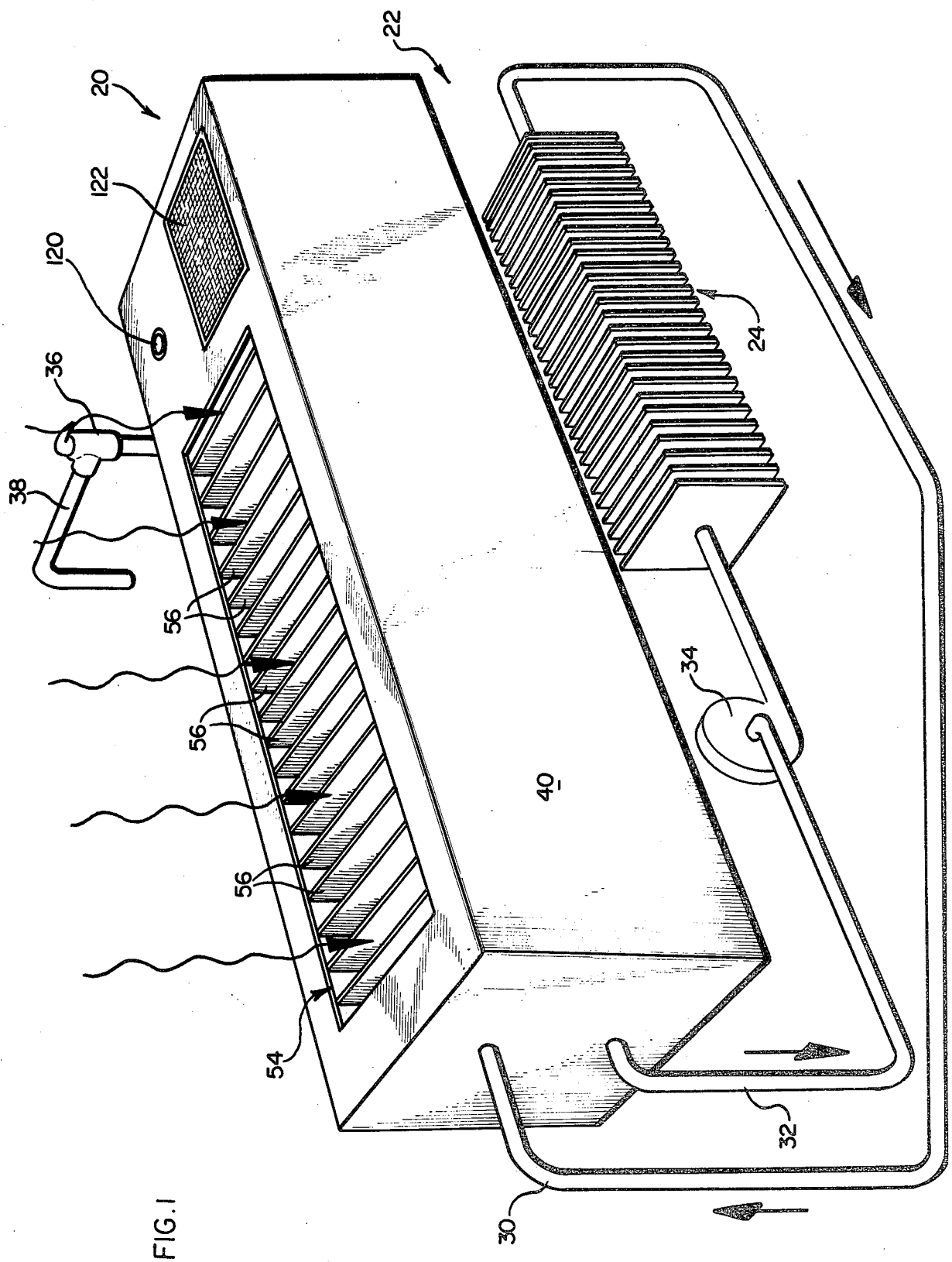
FIG. 1 is a perspective view of a thermal energy storage and transfer system constructed in compliance with the present invention.

Referring now in detail to the drawings and giving first consideration to FIGS. 1 and 2, a thermal energy storage and transfer system, indicated generally by the reference numeral 20, comprises a substantially closed fluid network 22 that includes a fin-and-tube or other type of radiator unit 24, a fluid storage vessel 26, and a heat absorber 28. Suitable conduits, including a return pipe 30 and a delivery pipe 32, interconnect the several elements of the fluid network; and advantageously, a fluid pump 34 is joined in circuit between the delivery pipe 32 and the radiator unit 24 in order to cause circulation of the fluid, heat-transfer medium. In addition, a pressure and temperature responsive relief valve 36 is coupled in an overflow conduit 38 to protect the various elements of the fluid network against the potentially damaging effects of excessive internal conditions. Water is usefully selected for use as the fluid, heat-transfer medium.

Conveniently, the heat absorber 28 and the storage vessel 26 are housed in a sheet metal cabinet 40; and turning to FIG. 3, the storage vessel 26 is mounted in the cabinet 40 on the divergent arms of a plurality of wooden saddle arrangements 42 using saddle clips 44 which are welded or otherwise suitably secured to the exterior wall of the storage vessel. In addition, the cabinet 40 is mounted on wooden framework elements 46, 48 and 50; and thermal insulation material 52 is situated between the storage vessel 26 and the saddle arrangements 42. The storage vessel 26 is additionally insulated as will be described hereinafter.

In order to expose the heat absorber 28 to incident solar radiations, the cabinet 40 is provided with a top opening 54; and the degree of exposure achieved through the opening 54 is regulated by a louver arrangement that includes a plurality of selectively movable vanes 56 which will be described more fully hereinbelow. The exposed, upper, external surface of the storage vessel 26 is provided with a flat black coating in order to define the heat absorber 28, although other types of heat collectors may also be utilized. In addition, the cabinet 40 is constructed with inner sidewalls 58 which are provided with polished reflective surface coatings in order to focus incident radiations on the black-body heat absorber 28. Advantageously, the spaces between the inner and outer sidewalls of the cabinet 40 are filled with suitable thermal insulation material 60; and additional quantities of thermal insulation material 62 are appropriately configured over the opposite ends of the heat storage vessel 26, as is shown in FIG. 2.

In compliance with the principles of the present invention, a cylindrical container 64 is permanently located in a stationary position generally within the fluid storage vessel 26 in heat-transfer exchange with the water that is filled therein, using suitable mounting means such as arcuately spaced brackets 66. The cylindrical container 64 is conveniently fabricated from steel, internally lined with a coating of phenolic resin, for example, and substantially completely filled with a quantity of thermal energy storage material 68. The container 64 is also hermetically sealed by means including an annular gasket 70, gasket 70 being compressed between a collar 72 which is welded adjacent the otherwise open end of the container 64 and a circular cover 74 which is bolted tightly to the collar 72.

The thermal energy storage material 68 advantageously comprises a hydrated magnesium salt mixture which exhibits nucleating properties. Moreover, the salt is desirably a mixture of about 60% magnesium nitrate hexahydrate and about 40% magnesium chloride hexahydrate. This magnesium salt mixture is known to be hygroscopic in the solid crystalline state but less moisture sensitive in its liquid state. Advantage is taken of these facts by charging the salt mixture into the container in a molten condition at about 150°–160° F. and thereafter promptly sealing the container with the cover 74 and the gasket 70. The container 64 is desirably filled to at least about 95% of its capacity with the molten thermal energy storage material in order to minimize the amount of moisture present in the headspace that is left for thermal expansion.

The preferred salt mixture has a boiling point of 280° F. (138° C.) and a specific gravity of 1.60. The magnesium nitrate hexahydrate component, moreover, exhibits a total heat of fusion of approximately 36 calories per gram, being the sum of the melting endotherm at 89° C. of 33.3 calories per gram and its crystal transformation at 73° C. of 2.6 calories per gram. The magnesium chloride hexahydrate component augments these thermal properties so that the salt mixture displays a heat of fusion at 135° F. of 58 B.T.U. per pound and additionally serves to suppress undesirable supercooling of the molten mixture.

Returning to a consideration of FIGS. 2 and 3 for a description of the selectively movable vanes 56 and associated structure, the vanes 56 will be seen mounted for swingable operation on individual, horizontal pivot rods 76 and fashioned with oppositely notched edges in order to nest in mutually overlapping relationship in the horizontal position, thus selectively and efficiently sealing the heat absorber 28 from incident solar radiations. Advantageously, a transparent plastic glazing panel 78, fabricated for example from polycarbonate resin, is interposed in fixed position between the vanes 56 and the heat absorber 28 in order to protect the heat absorber from atmospheric precipitations such as rain, dust and the like. In addition, weep holes 80 are perforated through the side walls of cabinet 40, as shown in FIG. 3, in order to allow for drainage.

To accomplish opening and closing of the louver system defined by the pivotal vanes 56, a pusher rod 82 is mounted for horizontally reciprocable motion in a guide journal 84 to be operated from a cam 86 to which it is connected by a pivot pin 88, the cam 86 being fastened in the cabinet 40 by means of bracket 90 and a pivot pin 92. The pivot pin 92 defines the center about which the cam 86 rotates. A suitable number of rigid, upright fingers 94 are fastened at uniform intervals along the operating length of pusher rod 82 to be connected at their upper ends to the individual vanes 56 by means of hinges 96. Motive power is delivered to the cam 86 by a link 98 that is pivoted at its upper end to the cam 86 by a pin 100, the lower end of link 98 being eccentrically mounted on a drive disc 102 by means of a pin and bracket arrangement 104. In turn, the drive disc 102 is selectively and reversibly rotated by means of the electrically energized, reversible, direct current motor of a motor-and-gear unit 106.

A power cable 108 connects the motor-and-gear-reducer drive unit 106 to the electric control circuitry housed in a control box 110; and a temperature sensing probe 112 extends into the water space of storage vessel 26 to be connected to the electrical control devices by means of a cable 114. Operating power is delivered by a battery 116 which is connected to the electrical controls by a suitable cable 118.

In addition to the water-temperature sensing data provided by probe 112, supplementary circuit operating information is supplied by a photocell 120, preferably of the cadmium sulfide type, physically positioned as shown in FIG. 1; and charging current is delivered to the battery 116 by an array of photovoltaic silicon solar cells 122 located adjacent the photosensor 120. Provision of the solar cells 122 achieves self-contained operation.

Turning to a consideration of the control circuitry which is schematically illustrated in FIG. 4, a blocking diode 124 is usefully disposed in series circuit between the battery 116 and the solar cells 122 in order to insure proper battery charging and prevent unwanted battery discharging.

The temperature sensing probe 112 advantageously includes a bimetallic switch 126; and as is shown in FIG. 4, the remainder of the electrical controls comprise a position-responsive switch arrangement 128 having a normally closed switch 130 and a normally closed switch 132. In addition, the circuitry includes a control relay having a relay coil 134 which selectively operates normally closed relay contacts 136 and 138 and normally open relay contacts 140 and 142, the several pairs of relay contacts being connected in circuit as shown.

For purposes of affording a more complete understanding of the invention, it is advantageous at this juncture to provide a functional description of the mode in which the component parts cooperate.

Assuming that battery 116 has been charged by the photovoltaic solar cells 122, that sunlight is incident on the photosensor 120, that the louver arrangement of vanes 56 is closed, and that the temperature of the water in the storage tank 26 is within the desired operating range, the photosensor 120 will be in the conducting condition and the switch 126 associated with the water temperature sensing probe 112 will be in open circuit condition. The relay coil 134 will thus be de-energized; and with the louver arrangement of vanes 56 closed, the switch 132 will be in its normally closed state and the switch 130 correspondingly closed. Except for the photosensor, the circuitry will thus be de-energized as is shown in FIG. 4.

As heat is drawn from the system by the radiator 24, the temperature of the water will ultimately be lowered outside of the operating range; and this condition will be sensed by the probe 112 closing the cooperating switch 126 to energize the relay coil 134, resulting thereby in a reversal in the condition of the several relay contacts. Relay contacts 140 and 142 will thus be closed and relay contacts 136 and 138 will be open whereby to complete a circuit from battery 116 to the motor 106 through the contacts 140 and 142 and the normally closed, position-responsive switch 130. Thereupon, the motor 106 will drive the vanes 56, through the cam 86 and the pusher rod 82, to the open condition exposing heat absorber 28 to the incident solar radiations.

When the vanes 56 achieve their fully open condition, the position-responsive switch 128 will sense this configuration and respond by opening switch 130 to break the circuit through motor 106 ceasing its operation. The slaved switch 132 will be open and without result because the series connected relay contacts 138 are held open at this time by the energized relay coil 134. Hence, the vanes 56 will remain open allowing solar radiations to be absorbed, heating the water in storage vessel 26 and ultimately causing the thermal energy storage material 64 in container 68 to be phase-changed to the molten condition by the absorption of heat energy.

When the thermal energy storage system comprising the salt mixture in container 64 and the water in vessel 26 reaches the selected upper temperature limit, through the absorption of sensible heat, the probe 112 will sense this condition and respond by opening the circuit through relay coil 134, restoring the relay contacts 136–142 to their normal condition, completing a circuit from the battery 116 through the relay contacts 138 and the switch 132, the motor 106 and the relay contacts 136, resulting in energization of the motor 106 for reversible drive to close the louver arrangement of the vanes 56.

When the vanes 56 reach the closed condition, the position-responsive switch 128 will respond by opening the switch contacts 130 and 132, thus stopping rotation of the motor 108.

The photosensor 120 serves to prevent thermal demand, as sensed by the probe 112 and its corresponding switch 126, from opening the louver arrangement of vanes 56 in the absence of incident solar radiation.

The drawings in the foregoing description are not intended to represent the only form of the invention in regard to the details of its construction and manner of operation. Changes in form and in the proportion of parts, as well as the substitution of equivalents, will contemplate as circumstances render expedient; and although specific terms have been employed, they are intended in a generic and descriptive sense only and not for the purposes of limitation, the scope of the invention being delineated in the following claims.

The invention is claimed as follows:

1. A thermal energy storage and transfer system comprising: storage vessel means for heat transfer fluid including heat absorber surface means exposable to incident solar radiation; insulation means enclosing said storage vessel means away from the region of said heat absorber surface means; radiator means interconnected with said storage vessel means to form a substantially closed fluid network; water in said network to define a heat transfer medium; a unitary thermal accumulator container mounted in stationary position substantially inside said storage vessel means in contact with said medium and having a filler opening and hermetic closure means for said opening disposed outside said storage vessel means and embedded in said insulation means; and thermal energy storage, phase-change material which is adversely sensitive to excess moisture, charged into said container, including a nucleatable, hydrated magnesium salt.

2. A thermal energy storage and transfer system according to claim 1 wherein said salt is a mixture of magnesium nitrate hexahydrate and magnesium chloride hexahydrate.

3. A thermal energy storage and transfer system according to claim 2 wherein said mixture comprises about 60% magnesium nitrate hexahydrate and about 40% magnesium chloride hexahydrate.

4. A thermal energy storage and transfer system according to claim 1 wherein said heat absorber surface means further includes a plurality of movable vanes positioned between said heat absorber surface means and the incident solar radiation, and adjustment means for angulating said vanes.

5. A thermal energy storage and transfer system according to claim 6 wherein said adjustment means includes thermal sensor means positioned to determine the temperature of the water in said storage vessel, electric drive motor means, actuator road means interconnecting said vanes, motion transfer means coupling said drive motor means and said actuator rod means, and control means for selectively operating said drive motor means in accordance with the water temperature sensed by said thermal sensor means.

6. A thermal energy storage and transfer system according to claim 5 which further includes photovoltaic means exposed to the incident solar radiation for energizing said drive motor means.

7. A thermal energy storage and transfer system according to claim 5 which further includes light sensor means for sensing the incident solar radiant on said solar heat absorber surface means and second control means for selectively operating said drive motor means in accordance with the incident solar radiation levels sensed by said light sensor means.

* * * * *